Nov. 11, 1941.   G. W. HARDMAN   2,262,606
TANK FOR AIRCRAFT
Filed June 26, 1939   3 Sheets-Sheet 1
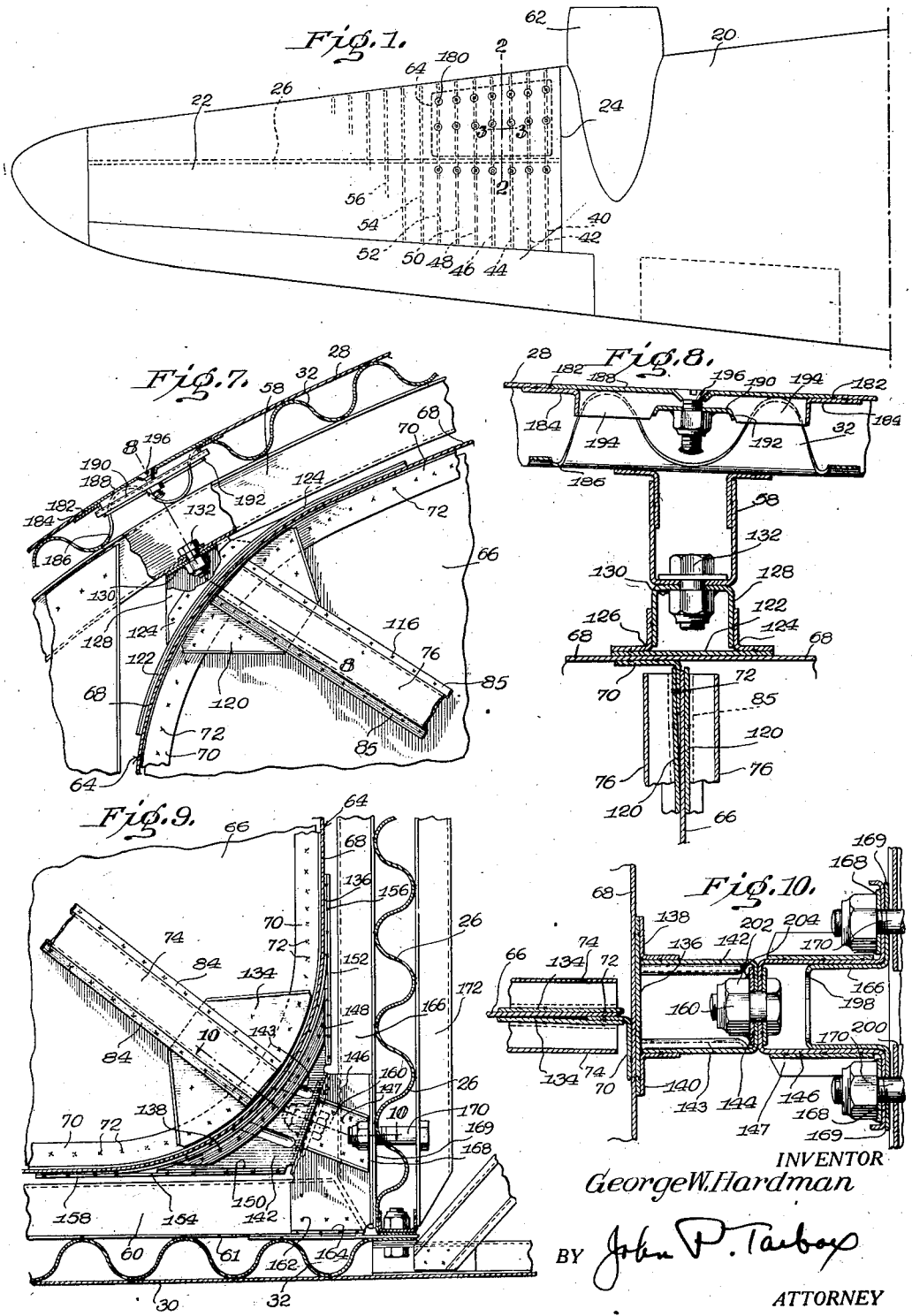
INVENTOR
George W. Hardman
BY John P. Tarbox
ATTORNEY Nov. 11, 1941.   G. W. HARDMAN   2,262,606
TANK FOR AIRCRAFT
Filed June 26, 1939   3 Sheets-Sheet 2
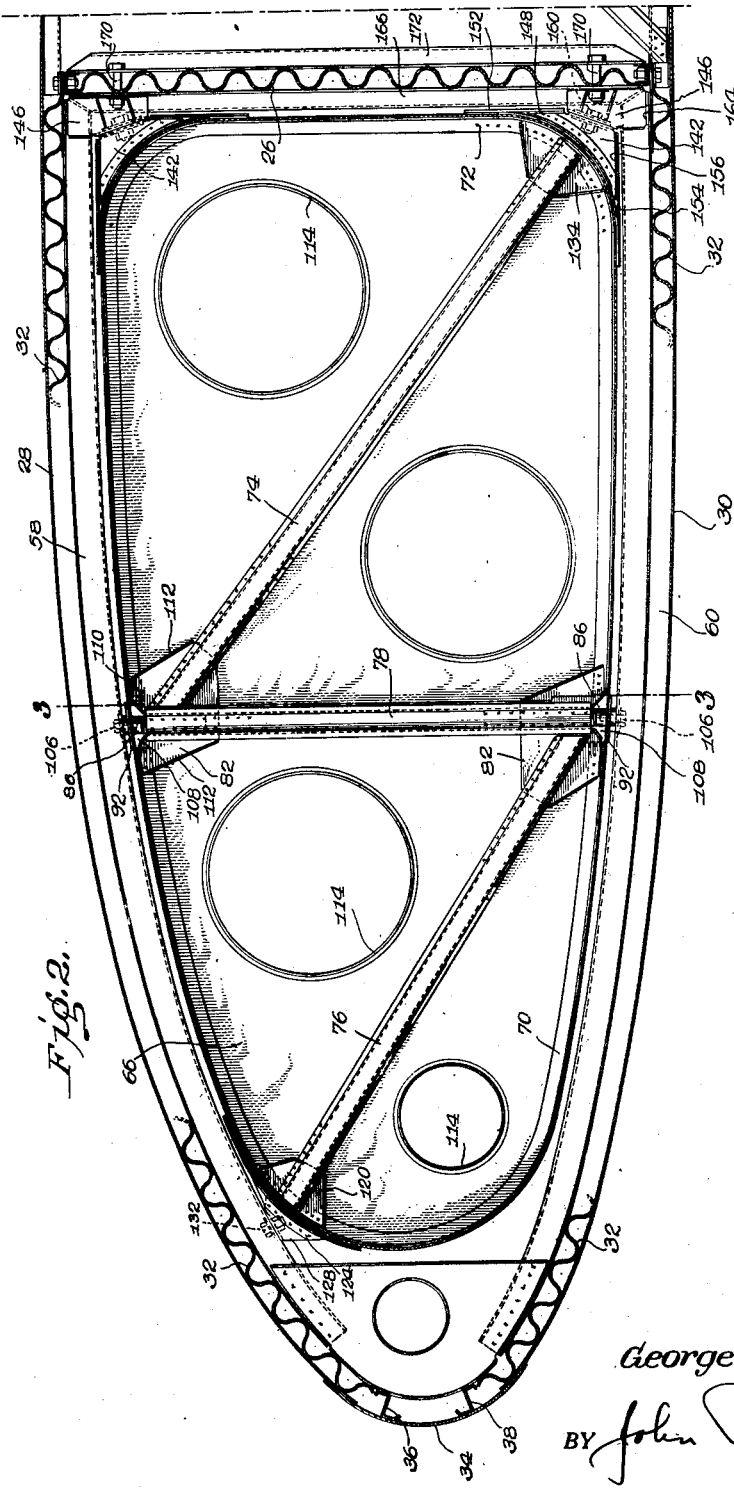
INVENTOR
George W. Hardman
BY John P. Carbox
ATTORNEY Nov. 11, 1941.  G. W. HARDMAN  2,262,606
TANK FOR AIRCRAFT
Filed June 26, 1939  3 Sheets-Sheet 3
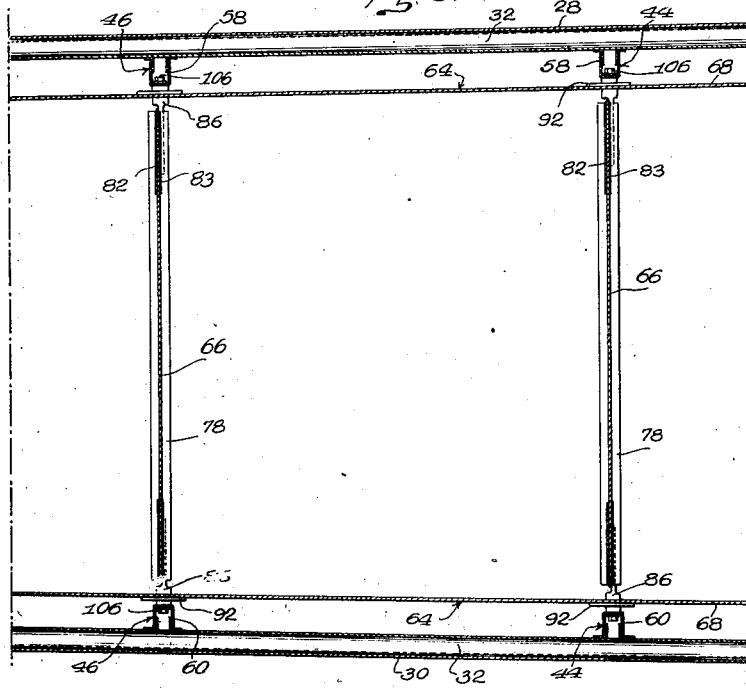
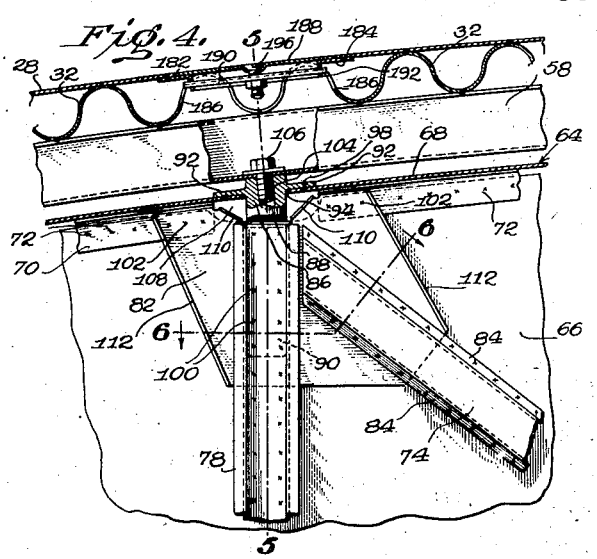
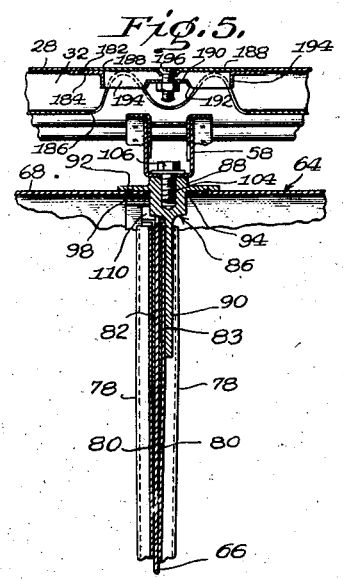
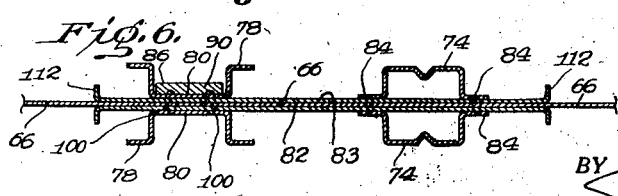
INVENTOR
George W. Hardman
BY
ATTORNEY Patented Nov. 11, 1941

2,262,606

UNITED STATES PATENT OFFICE 2,262,606

TANK FOR AIRCRAFT

George W. Hardman, Brookline, Pa., assignor to Edward G. Budd Manufacturing Co., Philadelphia, Pa., a corporation of Pennsylvania Application June 26, 1939, Serial No. 281,079

1 Claim. (Cl. 244—123)

The present invention relates to aircraft, and more particularly to a combined tank and frame structure for airplane wings.

Airplane wings, particularly of the cantilever type usually have an airfoil contour having considerable thickness, and affording considerable space between the top and bottom skin sheets which may be advantageously employed for fuel storage tanks. The internal structure of the wing, necessary to give the cantilever structure thereof strength, considerably honeycombs the space inside, heretofore precluding the use of large tanks because of interference with structural members. Such internal structure may consist of a plurality of airfoil contoured rib trusses lying in spaced vertical planes extending fore and aft, and a shear web member, or members, extending spanwise in a vertical plane. In one form of wing structure, the leading edge and top and bottom skin structures together with a single shear web form a torsion box of elongated "D" cross-section which box contains spaced parallel truss members or ribs. The forward half of the wing comprising the torsion box is the principal load carrying portion of the wing and it is therefore most desirable to position fuel tanks in this space, but with the closely spaced rib truss members traversing this space, tanks of any size have heretofore been precluded, unless the trusses themselves have been weakened or repositioned in less advantageous positions insofar as strength of wing is concerned.

The present invention is adapted to utilize the space between the upper and lower surface at the forward portion of airplane wings for relatively large storage tanks adapted to contain fuel, water, or the like, and is adapted to accomplish this without weakening the wing construction, and without necessitating the use of a large number of relatively small separate tanks separated from one another by trusses cutting thru the space. This is accomplished by providing a plurality of struts within a tank, and aligning the struts within the tank with the truss structure so that the struts may be rigidly secured to the truss structure and become a part thereof, as well as combine with the baffle structure of the tank.

Accordingly, an object of the invention is to provide a tank structure of considerable size for use in an aircraft wing and in which the tank structure itself forms a part of the truss structure of the wing.

Another object of the invention is to provide a tank structure for an aircraft wing in which internal baffle plates of the tank structure cooperate with the truss structure of the wing to increase the strength thereof.

A further object of the invention is to provide a tank structure for an aircraft wing in which a tank is adapted to intersect one or more rib members of the wing, and in which the tank structure has a reinforced baffle adapted to lie in the plane of each rib member so intersected and in which the strength of each baffle structure is adapted to cooperate with each rib member so intersected so as to impart sufficient strength to such rib member.

Still another object of the invention is to provide a tank structure for aircraft wings in which the tank structure intersects and forms a structural part of one or more rib members and in which the tank structure is adapted to be readily withdrawn and disassembled from the rib structures and the wing structure without injury thereto and in which substitute tanks may be inserted readily without any substantial complication.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claim.

In the drawings, wherein similar reference characters refer to similar parts through the several views:

Fig. 1 is a top plan view of an aircraft wing showing the general location of the tank and the main structural members of the wing;

Fig. 2 is an enlarged sectional view taken through the wing and the tank of Fig. 1 and on section line 2—2;

Fig. 3 is a spanwise enlarged section through a portion of the tank and the wing taken on the line 3—3 of Fig. 2;

Fig. 4 is an enlarged detail of the upper central portion of Fig. 2 with parts broken away;

Fig. 5 is a section taken on the line 5—5 of Fig. 4;

Fig. 6 is a section taken substantially on the line 6—6 of Fig. 4;

Fig. 7 is an enlarged sectional detail view of the forward upper portion of Fig. 2 with portions broken away;

Fig. 8 is a still further enlarged section of Fig. 7 taken substantially on the line 8—8;

Fig. 9 is an enlarged detail view of the lower rear portion of Fig. 2; and

Fig. 10 is a section through Fig. 9 taken substantially on the line 10—10.

Referring to Fig. 1, there is diagrammatically shown an aircraft wing of the cantilever type having the fuselage portion 20 and a tip portion 22, the same being separable from the fuselage portion on the line 24 as is well understood in the art since, for practical reasons, wing structures are made in separable sections. The tip portion may be of the D spar type such as will appear clear from Fig. 2, although the longitudinally extending shear web 26 is invisibly indicated in Fig. 1. Referring to Fig. 2, the D spar will be seen to have top and bottom reinforced skin surfaces 28 and 30 having corrugated backing metal 32 for stiffening and reinforcing purposes. The top and bottom skins 28 and 30 are joined together at the nose through a tip plate 34 which is stiffened by Z members 36 and 38. As is illustrated also in Fig. 1, a plurality of ribs 40, 42, 44, 46, 48, 50, 52, 54, 56, etc., are provided, extending transverse to the shear web 26 in order to give the wing surfaces the proper airfoil contour and for providing the necessary strength.

In wing structures of this type, the rib structures generally are composed of a pair of spaced chord members each having the proper curvature to support an adjacent wing surface and the chord members are connected together by suitable struts and braces arranged in truss formation. As illustrated in Fig. 2 and Fig. 3, such chord members appear as 58 and 60. In order to efficiently distribute the load and weight in an airplane, the various heavy parts thereof are often distributed along the wing so that their load may be directly carried thereby. For example, in Fig. 1, an engine nacelle 62 is shown located part way out the wing structure, thereby more directly loading the wing structure. The supply of fuel also constitutes a heavy load which has heretofore been located, to considerable extent, within the wing structure and, as is illustrated in Fig. 1, a fuel tank such as 64 according to a main feature of the present invention is located within the wing structure. As has previously been set forth, the honeycombing of the bracing required within the wing structure has required the use of a series of small tanks filling such spaces as occur. In some instances, spaces free from braces and other structure have been purposely enlarged in order that a larger tank might be accommodated, and this has been done to the detriment of the strength of the whole structure.

It will appear in Fig. 1 that the tank 64 is arranged in such a way as to intersect a number of rib structures, namely 40—52, and in order to prevent such intersection from weakening the wing structure, the present invention contemplates providing within the tank such complementary braces and struts, which may be arranged to lie in the planes of the rib members, as would ordinarily have been present in the rib members, were it not for the intersecting tank. In a tank of the size illustrated, it is necessary to employ a considerable number of spaced baffles in order to prevent the surging of the liquid within the tank during rough weather and maneuvers, and a feature of the present invention contemplates the aligning of these baffle plates within the planes of the ribs intersected by the tank. As shown in Fig. 3, the chords 58 and 60 may be those of any of the rib members 40 through 52, and are aligned with baffles 66 arranged within the tank itself. The tank itself is composed of an outer shell 68 secured to the baffle members by angle pieces 70 spot welded to the shell and baffles at frequent intervals as illustrated at 72.

Since the baffle plates themselves have considerable strength in tension, and by employing stiffening members may also have strength in compression, the same may combine together with stiffening members to form the bracing structure required by each rib where intersected by the tank. Thus, as is illustrated in Fig. 2, the baffle plate 66 is provided with stiffening flange channel members, arranged in the form of diagonals 74 and 76, and a vertical strut 78. As is illustrated in Fig. 6, the vertical strut 78 is composed of a pair of flanged channels arranged with their base portions 80 in back-to-back relation and against the baffle plate 66, or the baffle plate and such gussets 82 and 83 as may be employed adjacent the end of the strut for strengthening purposes. The base portions 80 of the channel members forming the strut 78 are spot welded together through the baffle plate 66 at frequent intervals along its length so that all members form in effect an integral column.

Diagonals 74 and 76 are also composed of flanged channel members but are arranged on opposite sides of the baffles with their flanged portions 84 in contact with the baffle or such gusset plates as are arranged near the extremity to strengthen the baffle. Likewise, a series of spot welds secure the flanges of the opposite channels forming the members 76 and 74 through the intervening baffle 66 and such gusset plates as 82 and 83 as will be required, the spot welds being arranged along the length thereof to form an integral structure between the members.

In order to transmit the stresses of the strut 78 and the brace member 74 through the skin of the tank and to the chord member 58, a stress transfer member 86 is employed having a cylindrical portion 88 and a flat shank portion 90, the cylindrical portion also being provided with a disc flange 92. Through an aperture 94 in the tank skin 68, the cylindrical portion of the stress transfer member extends, and the flange 92 thereof is seam welded to the tank skin in fluid-tight manner as is illustrated at 98. The shank portion 90 of the stress member is aligned with and extends along one side of the strut 78 and lies within the channel thereof and is spot welded to the strut at a plurality of points as is indicated at 100. Thus, the shank portion is rigidly secured to the strut 78, the gussets 82, the baffle plate 66, and thus has a rigid connection to the upper end of the diagonal 74. Additionally, the flange of the stress member has a rigid connection to the tank skin 66, and through the angle members 70 has a rigid connection to the gusset plates 82 through the spot welds, for example, 102.

The end of the stress transfer member may be provided with a threaded aperture 104 adapted to receive a bolt 106 passing through the base of the chord member 58. Thus, the stresses imposed upon the chord member are transferred to the strut member 78 and brace 74 and vice versa and the same are held in rigid relationship with the chord member just as though they were permanently secured thereto.

The adjacent ends of the strut 78 and the brace 76 are secured in a substantially identical manner to that heretofore described with relation to the adjacent ends of the strut 78 and members 74. Since it is desirable that the liquid within the tank be permitted to flow freely from one end to the other of the tank at a low point in the tank, the gusset members may be cut away, as at 108, so as to provide a space for fuel to flow from one side of the baffle to the other. The metal, instead of being cut away, may form a flange such as 110 to stiffen the gusset and such other flanges, such as 112, may likewise be used for stiffening purposes. The individual baffle plates may also have large apertures therein such as 114 which will be preferably flanged to assist in stiffening the baffle plate.

The brace members 76 and 74 at their ends, that is the forward, upward corner or the lower, rear corner, are adapted to transmit their stresses through the tank as is illustrated more particularly in Figs. 7 and 8 and Figs. 9 and 10. Referring particularly to Figs. 7 and 8, the brace member 76, composed of flanged channel members on opposite sides of the baffle 66, are secured with their flanges 85 secured to one another through the baffle 66 through the many spot welds 116 located along the length thereof. At the end, gusset plates 120 on both sides of the baffle 66, are provided between the channel members, and at the tip end, the stresses from the baffle plate 66, channel members 76 and gusset plates 120 are transmitted to the angle strip 70 and thence to the skin of the tank 68. On the outside of the tank at this point, are positioned a strengthening plate 122 together with spaced parallel facing angle strips 124 and 126 between the facing angles of which is arranged a channel member 128 having a face 130 adapted to be secured to the chord member 58 through the threaded fastening means 132. The angle strip 70, reinforcing strip 122, angle pieces 124 and 126, as well as the channel member 128 are all secured together by a series of spot welds substantially as shown and the stresses from the brace 76 are transmitted through the chord member 58 through the fastening means 132, the latter lying substantially in line with the brace.

The brace member 74 (see Figs. 9–10) terminates in a manner similar to that of 76, there being provided gusset plates 134 on either side of the baffle plate 66 and squeezed between the flanges 84 of the channels of the brace member 74. Again the stress is transmitted through the skin of the tank through the angle member 70 to a reinforcing plate 136, spaced parallel fastening angle members 138—140 and a channel member 142 having a face 144 thereof adapted to be secured to a complementary channel member 146 secured to a shear web and rib. The members 142 and 146 may be stiffened as shown at 143 and 147. The channel member 142 is provided with outwardly extending flanges 148 and 150 along the edges of its side walls, which flanges are spot welded to flat plates 152 and 154 extending tangentially into engagement with the tank at 156 and 158. As before, except for the threaded fastening means 160 all the parts are preferably spot welded at frequent intervals in order to secure the parts in proper relationship. The upper right hand corner of the tank is provided with a similar fastening means to the lower corner of the tank, with the exception that the gussets 134 are not present for the reason that no brace members such as 74 extend to this corner and the parts therefore, are otherwise identical to those in the lower right hand corner.

The complementary channel member 146 embraces the chord member 60 and is spot welded thereto as at 162. The channel member is also provided with flanges 164 which are similarly welded to the flanges 61 of the chord member 60.

The channel attaching member 146 closely embraces the flanged channel member 166 extending vertically across the shear web 26 and is secured to the shear web through laterally extending flanges 168 on the attaching channel and the flanges 169 of the shear web channel 166 to which the flanges 168 are welded. The bolts 170 extending through the flanges of the flanged channel member 166 and the fastening channel member 146 extend through the shear web to an opposing flanged channel member 172 as is illustrated in Figs. 2 and 9.

Since for repairs and replacements it may even be desirable to remove the tank from the wing, the tank has a generally tapered, gradually reduced cross section as it extends outward into the wing, and by removing the fastening means 160, 170, and 132, at each of the ribs, it is possible to slide the tank lengthwise of the wing out through its root and when that section of the wing is detached from the remainder of the wing as on the line of separation 24. To remove the fastening means or to reinsert the same upon assembly of the wing and tank, access holes 180 are provided, the details of which are illustrated in both Figs. 4 and 5 as well as 7 and 8. Referring to Fig. 4, it will be seen that the skin sheet 28 is provided with a round aperture 182 and an annular flange 184 around the rim thereof and on the inside surface of the skin. Also, the corrugated backing metal 32 is cut away as at 186 so that free access to the bolt 106 is afforded through the use of any well known socket wrench. To cover the hole, a disc cover plate 188 adapted to closely fill the aperture 182 and to seat upon the flange 184 is provided and to hold the same in place, a transverse bridge member 190 is provided adapted to engage notches 192 in the depending portion 194 of the flange 184, and by drawing the screw and nut 196 between the bridge 190 and the disc 188, the aperture is securely closed in a smooth workman-like manner. It will readily appear that the bridge member when loose upon the screw may be inserted through the hole eccentrically and thereafter correctly positioned and drawn up tight as described. Such apertures are provided as is shown in Fig. 7 and Fig. 8 for the fastening means 132 and are also provided in conjunction with the fastening means 160 the same being arranged to the rear of the shear web and connection being obtained therefrom through apertures 198 in the vertical channel member 166 and an aperture 200 in the shear web 26, it being understood that through the use of a universal type of socket wrench, the fastening means may be readily inserted through such a line-up of apertures. It will be understood also that where the threaded fastening means includes a nut, the same will be secured in place by welding, for example, as is illustrated, in connection with the nut 202 and its weld connection 204 to the channel member 142.

From the foregoing description, it will appear that the tank, constructed as described, is readily insertable in the spaces provided for it in the rib structures of a wing and that upon insertion of the tank into such space, and the insertion and tightening of such fastening means as are provided for, the tank and its baffle plates and associated struts and braces cooperate with the chords of the rib structure so as to provide as strong a rib structure as would be possible were the tank not present. Further, it will appear that the baffle plates are considerably stiffened by the presence of the struts and braces, and that the braces and struts cooperate with the baffle plates to the end that both may be made lighter and both readily assist in performance of the other's function. While no particular end structure of the tank has been described, since in normal usage the end of tank would not be aligned with a rib structure, yet if desired, it will readily appear that the tank end structure could be associated with struts and braces adapted to cooperate with the rib in the same manner as the baffle structure illustrated.

While the preferred form of fastening the parts together has been set forth as spot welding or seam welding, since the latter readily lends itself to securing light weight, high strength stainless steel, any form of suitable fastening means or any form of material such as aluminum alloys and the like might be used, if desired, one of the principal features of the invention being the design of a tank removable from the wing structure and yet having the cooperation between its baffle structure, the wing rib structure, such as hereinabove described.

Although a single embodiment of the invention has been illustrated and described, it is to be understood that the invention is not limited thereto, but may be embodied in various mechanical forms and arrangements. For example, the arrangement of struts and braces may be altered to suit stress conditions. Since such changes in construction and arrangement of parts may be made as well as others, without departing from the spirit of the invention, as will be well understood by those skilled in the art, reference will be had to the appended claim for a definition of the limits of the invention.

What is claimed is:

In an airplane wing, a plurality of ribs, top and bottom skins covering said ribs, each of said ribs having top and bottom chord members, a fuel tank within said wing disposed between said chord members, a plurality of reinforcing truss structures within said tank, each of said truss structures being disposed substantially in the vertical plane of a rib and including a vertical strut, said strut having top and bottom ends extending through said tank and terminating in attaching faces in direct engagement with adjacent faces of the respective top and bottom chord members, said faces being disposed in planes extending longitudinally of the wing and transversely of the vertical planes of said struts, said top and bottom skins having openings therethrough in alignment with the respective ends of said struts, and cap screws insertable through said openings for rigidly securing said engaged faces together, the axes of said cap screws being disposed in vertical planes substantially parallel to the vertical planes of said struts.

GEORGE W. HARDMAN.